United States Patent [19]

Chow

[11] Patent Number: 4,744,170
[45] Date of Patent: May 17, 1988

[54] SMALL ANIMAL TRAP WITH TRANSVERSE LOCKING SLOT ON GATE

[76] Inventor: Cornelius Chow, 5643 Dessert View Dr., La Jolla, Calif. 92037

[21] Appl. No.: 25,985

[22] Filed: Mar. 16, 1987

[51] Int. Cl.⁴ .................. A01M 23/18; A01M 23/06
[52] U.S. Cl. ........................................................ 43/61
[58] Field of Search ................... 43/58, 59, 60, 61, 62, 43/66, 69

[56] References Cited

U.S. PATENT DOCUMENTS

| | | | |
|---|---|---|---|
| 1,240,248 | 9/1917 | Please et al. | 43/61 |
| 1,286,898 | 12/1918 | Ammen | 43/61 |
| 1,581,297 | 4/1926 | Schmuck | 43/60 |
| 1,630,798 | 5/1927 | Morelli | 43/60 |
| 1,738,623 | 12/1929 | Westerlund | 43/69 |
| 2,510,168 | 6/1950 | Caldwell et al. | 43/61 |
| 4,550,523 | 11/1985 | Spiller | 43/61 |
| 4,578,892 | 4/1986 | Melton | 43/61 |
| 4,583,317 | 4/1986 | Beard | 43/61 |

Primary Examiner—M. Jordan
Attorney, Agent, or Firm—Frank D. Gilliam

[57] ABSTRACT

An animal trap suited for trapping rodents comprising an elongated container having a curved bottom surface and a vertically translatable gate for selectively enclosing an opening in one end of the container after the animal has entered the trap. When set, the trap rests on one end of the bottom surface by gravity with the gate held elevated from the container to permit an animal to enter the trap. When the animal travels toward the opposite end of the container toward the bait remote from the opening, the weight of the animal causes the container to rotate elevating the open end of the container, releasing the gate thereby closing the opening to the container and trapping the animal therein. The gate remains closed by gravity acting downward thereon.

9 Claims, 1 Drawing Sheet

SMALL ANIMAL TRAP WITH TRANSVERSE LOCKING SLOT ON GATE

BACKGROUND OF THE INVENTION

1. Field of the Invention

The invention relates generally to animal traps and more particularly to traps for catching small animals.

2. Brief Description of the Prior Art

Small animal traps can be generally divided into two broad classifications: those that kill and mutilate the animal, such as the familiar spring-loaded snap trap; and those that trap the animal alive in an enclosure. The live traps, by design, can be either disposable and/or reusable.

The instant invention is directed to the latter type where the animal is trapped alive and uninjured. Traps of this type are taught by U.S. Pat. Nos. 4,550,523 and 4,578,892.

U.S. Pat. No. 4,550,523 teaches a rodent trap with a housing having a rectilinear exterior bottom surface with an integral fulcrum positioned at the approximate mid-point of the exterior bottom surface. The location of the fulcrum permits the entire enclosure to assume a downward inclination toward whichever end of the enclosure a trapped animal chooses to occupy. A door member consisting of a surface conforming to the shape of the open end of the enclosure includes two sides, each side pivotly mounted to the enclosure. The surface on which the enclosure rests when having a normal upward inclination absent a rodent therein prevents rotational closure of the door. Whenever the enclosure first assumes a downward inclination by rodent travel, the door rotates to a closed entrance position by gravity acting thereon and maintains that position until manually released.

U.S. Pat. No. 4,578,892 teaches an animal trap not unlike the teaching of U.S. Pat. No. 4,550,523 discussed above. The trap comprises an elongated container having two contiguous bottom surfaces foming an obtuse angle therebetween (an effective fulcrum at their joinder) and a pivotable door for selectively enclosing the container after the animal has entered and traveled to the opposite end thereof. When set, the trap rests on a first of the two bottom surfaces with the door held in a rotated position elevated from the container entrance by the trap underlining support surface to permit an animal to enter the trap. The second of the two bottom surfaces is elevated from the underlying support surface. When the animal enters the container and travels into the now elevated bottom surface, the animal's weight causes the container to rotate about the bottom surface joinder fulcrum in a teeter-totter fashion, lowering the second bottom surface and elevating the first bottom surface releasing the door for gravitational rotation, closing the container entrance and trapping the animal therein.

These two prior art traps are effective for the purpose intended; however, they cannot be utilized to complete success on carpet, grass, sand or other irregular support surfaces. When subjected to this type of irregular surfaces, the door may not positively close and lock and the animal can back out through the entrance. Also, if a large enough animal enters the container, his tail may extend out the opening preventing a positive lock of the rotated door. The animal could, in case of U.S. Pat. No. 4,578,892, impact the door hold open supports, causing the door to rotate closed with the animal still exterior of the container.

There is a continuing need for an animal trap which includes the beneficial features of the prior art and overcomes all of the deficiencies encountered therein.

SUMMARY OF THE INVENTION

The present invention overcomes the aforementioned disadvantages of the prior art by providing a trap that can be successfully used on all types of support surfaces including those on which the prior art devices are inoperable. The trap enclosure of the present invention has an entrance gate at one end and a bait supply opening on the opposite end. The body of the container is curved between the ends. The curve takes the form of a linear curve or a parabola. In the parabola version, the steepest portion (having the smallest radius of curvature) is at the bait receiving end. The entrance gate includes a slightly tapered vertical slot for receiving a gate or door therein. The gate or door has a weighted top surface and a locking slot adjacent the bottom thereof for engaging the top of the vertical slot for holding the gate or door in an open position. When the container is rotated or rocked by animal travel therein, the locking slot is freed and the gate or door translates substantially vertically down the slot toward the bottom surface of the container by gravity. Due to the taper of the vertical slot, the door travels downward to a location near the end of the slot where it is held by friction. For disposal of the trap and the animal therein, the door can be forced further down the slot where it is locked in à closed position. The bait supply opening includes a cap or cover which seals the odor from the bait to the inside chamber of the container.

In operation, the entrance of the curved bottom surface rests on the support surface by the weight of the entrance gate and door. The door is elevated and tipped slightly toward the face of the entrance wherein the slot engages the top of the gate's inner surface holding the door in the elevated position. When the animal travels along the curved inner surface, toward the bait end, the container is caused to rotate along the curved surface until the gate or door becomes perpendicular with the support surface causing the door to translate along the tapered slot closing the entrance. The animal can be removed by sliding the gate of door in the opposite direction or the gate or door can be forced further into the tapered slot tightly securing the door in the closed position wherein the trap and animal can be disposed of.

It is therefore a principal object of the present invention to provide an animal trap which substantially reduces or overcomes the disadvantages of similar operating prior art devices and which is still of low cost configuration and therefore commercially more attractive than present state of the art traps.

It is a further object of this invention to provide an animal trap which is of substantially uniform integral configuration particularly suitable for low cost plastic molding manufacture or by other comparable low cost manufacturing techniques.

Still another object of this invention is to provide an animal trap which is reliable in operation when placed on any type support surface, smooth or irregular, carpet, lawn, dirt, sand or otherwise.

These and other objects of this invention will become more clearly apparent upon a review of the following description in conjunction with the accompanying drawings.

DETAILED DESCRIPTION OF THE DRAWINGS

Figure 1:
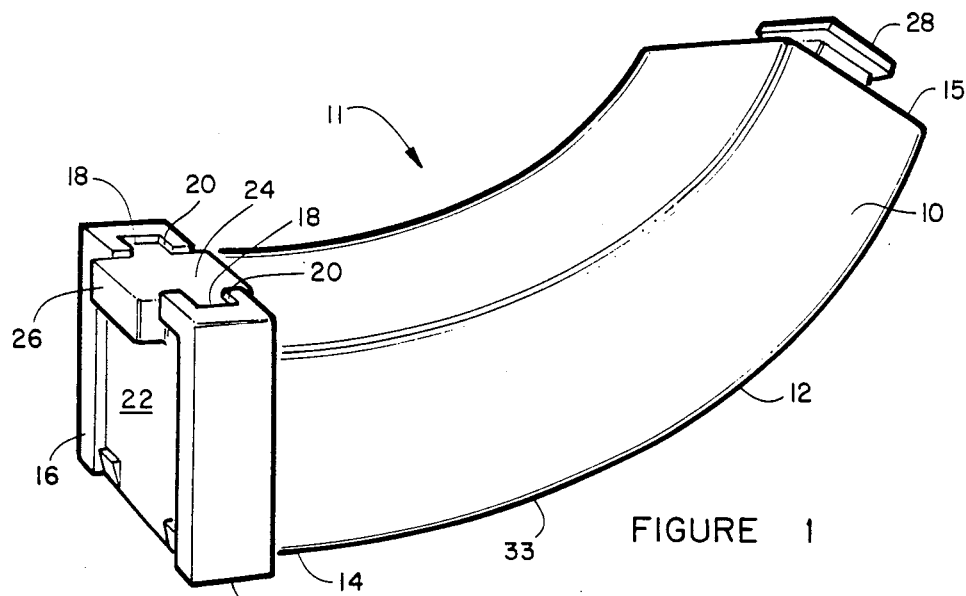
FIG. 1 is an elevated perspective showing of the trap of the invention.
Figure 2:
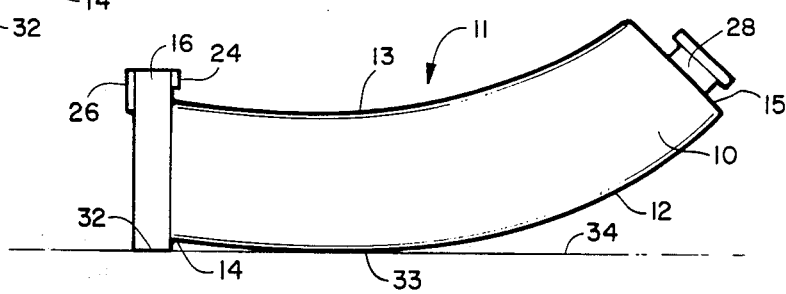
FIG. 2 is a side view of the trap of the FIG. 1 showing with the entrance door in a closed position.
Figure 5:
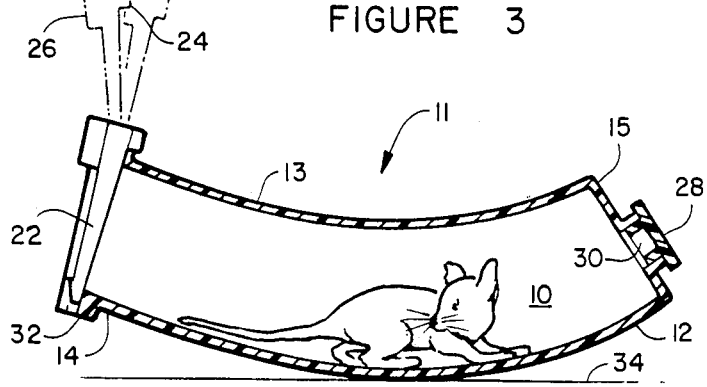
FIG. 5 is a showing similar to that of FIG. 3 with the travel of the mouse further therein.

Referring now to FIGS. 1 and 2, a hollow rectangular housing 10 forming the animal trap 11 is shown. The housing has a curved lower 12 and upper surface 13. In the FIG. 1 showing, the housing 10 is a curvilinear circular arc of a circle and in the FIG. 2 showing, the housing 10 is a curved arc in the form of a parabola with an increased circular radius toward the bait receiving end 15. End 14 of the container includes a rectangular gate housing 16 which surrounds all four sides of the end 14. The gate housing 16 includes a pair of vertical slots 18 on each side thereof. The back surface 20 slots taper toward the distal surface of the housing 16 at their lower end, see FIGS. 3 and 5. A gate 22 is translatably received in the slots. A weight 24 is integrally formed on top rear surface of the gate 22. A handle tab 26 extends toward the front of the gate to allow for removal of the gate when in the closed FIGS. 1 and 2 position and to provide weight to the upper surface of the gate.

A removable cap 28 with a bait pocket 29 removably encloses an opening 30 in container end 13. The opening under the cap allows for bait to be positioned within the container when the cap is installed within the opening. The cap 28 snuggly fits the opening preventing bait odor from exiting the rear of the container.

Figure 3:
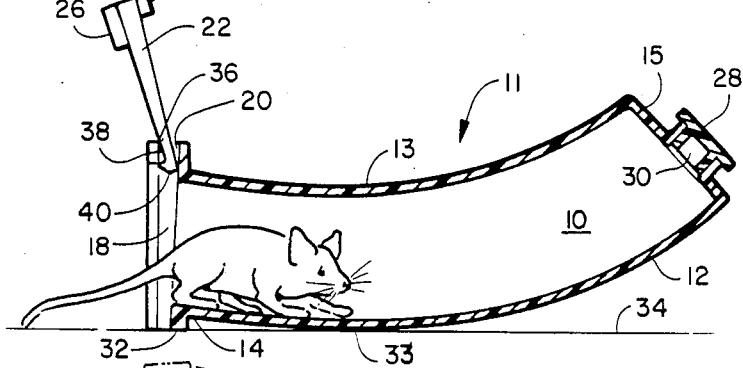
FIG. 3 is a side cut-away view of the trap of FIG. 1 with the door locked in an open position, and a mouse entering the trap.
Figure 6:
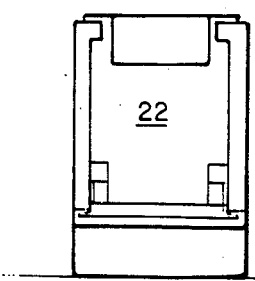
FIG. 6 is an end view showing of FIGS. 1 and 5.

The sequential operation of the trap is shown in FIGS. 3 through 6. FIG. 3 depicts a cross-section showing of the trap 11 in a set configuration ready to trap an animal, a mouse is shown as an example of a proposed animal to be trapped by the trap 11. The lower surface 32 of the gate housing 16 and a portion 33 of the container rests on a support surface 34. The support surface 34 is shown as a smooth surface only for the purpose of discussion. Any irregular surface, such as by way of example and not by way of limitation, carpet, sand, lawn, ground surface, etc., can be used to successfullutilize the trap. As aforementioned, the lower or support container surface 12 is longitudinally curvilinear between ends 14 and 15. The curvilinear form being either an arc from a circle or a portion of a parabola.

Figure 4:
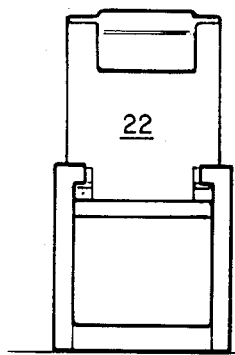
FIG. 4 is an end view showing of FIG. 3.

The gate 22 includes a transverse slot 36 which engages the upper forward rim surface 38 of the gate housing 16 for positioning the gate above the trap entrance opening as shown in FIGS. 3 and 4. As can be seen in FIG. 3, the weight 24 bearing downward forces the slot 36 against rim 38 and the lower end surface 40 of the gate against the inner walls 20 of slots 18. As the mouse advances through the opening and travels toward the bait at container end 13, the container is caused to rock elevating the gate housing end of the container upward causing the weight 24 to translate the gate toward the support surface 34 trapping the mouse within the container.

The trap can be discarded with the mouse trapped therein or the mouse can be released from the container unharmed. The taper of the door is slightly wider than the taper of the slots 16 so that when the gate translates as above described, the gate closes and locks slightly above a position of complete closure, see FIG. 6. This feature allows ease of release of the mouse from the trap. When the trap and mouse are to be discarded, the gate is forced further downward to a position of substantially complete closure binding the gate against the inner surface of slot 18.

The trap of the invention can be constructed of any suitable material, such as, by way of example and not by way of limitation, metal, plastic, heavy paper, wood, etc.

From the preceding, it should be evident that the animal trap presented herein is effective in operation, as in the luring and trapping of an animal. The trap is susceptible, of course, to changes, in proportioning and the selection of material for fabrication. Thus, the preceding should be considered illustrative and not limiting the scope of the invention. Accordingly, all such modifications are deemed to be within the scope of the present invention which is to be limited only by the claims appended hereto.

What is claimed is:

1. An animal trap comprising:
   a container having an open end for permitting entry by an animal to be trapped and a normally closed end, said container having a longitudinally curvilinear bottom surface, said open end is not elevated when the trap is in position for trapping said animal and is gradually elevated by the end-to-end rolling of said container along said bottom surface by the weight of said animal traveling within said container toward the normally closed end; and
   a translatable gate adapted to remain open when the open end of said container is not elevated and pivots toward said closed end and then translates downwardly to a closed normally open end position when said open end is elevated a predetermined amount, said gate includes a transverse locking slot positioned adjacent to the bottom thereof which engages the upper surface of said container adjacent to said open end thereof.

2. The invention as defined in claim 1 wherein the center of gravity of said trap when in said position for trapping is above said open end.

3. The invention as defined in claim 2 wherein said center of gravity changes when an animal enters said trap and thereafter travels substantially longitudinally along said container with said animal travel.

4. The invention as defined in claim 1 wherein said open end includes slots extending through said upper surface of said container which engage the sides of said gate for guiding said gate between said open and closed positions.

5. The invention as defined in claim 1 wherein said longitudinal curvilinear bottom surface is an arc of a circle.

6. The invention as defined in claim 1 wherein said longitudinal curvilinear bottom surface is a parabola.

7. The invention as defined in claim 1 further comprising a bait receiving opening in the end of said container opposite said open end for receiving bait for luring said animal into said container through said open end and a removable cover means for covering said bait receiving opening.

8. The invention as defined in claim 4 wherein the walls of said slots taper inward toward each other in a direction toward said bottom surface and said gate tapers in a similar manner.

9. The invention as defined in claim 8 wherein said gate when in a normally closed position can be forced further downward for sealing the opening to said container thereby.

* * * * *